(12) United States Patent
Ohhashi et al.

(10) Patent No.: US 8,635,633 B2
(45) Date of Patent: Jan. 21, 2014

(54) IMAGE FORMING APPARATUS, FUNCTION ADDING METHOD, AND COMPUTER-READABLE RECORDING MEDIUM

(75) Inventors: Hideki Ohhashi, Kanagawa (JP); Tsutomu Ohishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 159 days.

(21) Appl. No.: 12/963,687

(22) Filed: Dec. 9, 2010

(65) Prior Publication Data

US 2011/0145843 A1 Jun. 16, 2011

(30) Foreign Application Priority Data

Dec. 14, 2009 (JP) .................................. 2009-283310

(51) Int. Cl.
*G06F 3/00* (2006.01)
(52) U.S. Cl.
USPC .......................................... 719/328; 719/321
(58) Field of Classification Search
None
See application file for complete search history.

(56) References Cited

U.S. PATENT DOCUMENTS

| | | | |
|---|---|---|---|
| 6,470,380 B1 | 10/2002 | Yoshizawa et al. | |
| 7,117,493 B2 | 10/2006 | Matsushima | |
| 7,313,612 B1 | 12/2007 | Kakimoto | |
| 2003/0055890 A1 | 3/2003 | Senda | |
| 2004/0057067 A1* | 3/2004 | Ohishi et al. | 358/1.13 |
| 2004/0109188 A1* | 6/2004 | Akiyoshi et al. | 358/1.13 |
| 2007/0008583 A1* | 1/2007 | Araki | 358/1.15 |
| 2007/0047017 A1* | 3/2007 | Ando et al. | 358/448 |
| 2007/0064892 A1* | 3/2007 | Ando | 379/114.28 |
| 2007/0198999 A1* | 8/2007 | Ohhashi | 719/328 |
| 2008/0005029 A1 | 1/2008 | Ando | |
| 2008/0066084 A1* | 3/2008 | Akiyoshi et al. | 719/321 |
| 2008/0098389 A1* | 4/2008 | Akiyoshi et al. | 717/175 |
| 2009/0006071 A1* | 1/2009 | Dournov et al. | 703/22 |
| 2010/0153909 A1* | 6/2010 | Batey et al. | 717/104 |
| 2012/0066687 A1* | 3/2012 | Briscoe et al. | 718/104 |

FOREIGN PATENT DOCUMENTS

| | | |
|---|---|---|
| JP | 10-232788 | 9/1998 |
| JP | 11-110194 | 4/1999 |
| JP | 2001-175576 | 6/2001 |
| JP | 2002-152458 | 5/2002 |
| JP | 2007-012057 | 1/2007 |
| JP | 2008-016013 | 1/2008 |
| JP | 2008-186103 | 8/2008 |

OTHER PUBLICATIONS

Japanese Office Action dated Oct. 1, 2013.

* cited by examiner

*Primary Examiner* — Emerson Puente
*Assistant Examiner* — Dong Kim
(74) *Attorney, Agent, or Firm* — IPUSA, PLLC

(57) ABSTRACT

An image forming apparatus includes an application platform including at least one interface having an implementation that is blank, and an applying part configured to apply at least one additional program, capable of being dynamically added to another program, to the interface.

9 Claims, 10 Drawing Sheets

IMAGE FORMING APPARATUS, FUNCTION ADDING METHOD, AND COMPUTER-READABLE RECORDING MEDIUM

BACKGROUND OF THE INVENTION

1. Field of the Invention

The present invention relates to an image forming apparatus, a function adding method, and a computer-readable recording medium, for example, an image forming apparatus including an application platform, a function adding method, and a computer-readable recording medium.

2. Description of the Related Art

In recent years, among the image forming apparatuses referred to as multi-function machines or combination machines, there are image forming apparatuses that have an API (Application Program Interface) of an application platform (hereinafter also simply referred to as "platform") (See, for example, Japanese Laid-Open Patent Application No. 2008-16013). Many applications are developed on the platform by third-party vendors and the like. The user purchases an application suited for the user's business and the like and installs the suited application in an image forming apparatus (hereinafter also simply referred to as "machine"). Thereby, business efficiency can be achieved.

The platform is prepared with an API designed to fulfill as many needs as possible. However, because the uses of devices by the end-user are becoming more diverse and various applications are provided on a platform, there is demand for changing the platform after the device has been manufactured.

For example, in a case where there is a need to obtain information regarding a device for a newly developed application, the developer of a platform is required to obtain the information of the device for a newly developed application unless the platform has an API for obtaining the information of the device. Thus, the workload for the developer of the platform becomes significantly large whenever such need to obtain information arises. Therefore, the number of steps required for development cannot be reduced.

Theoretically, an API may be implemented to provide information of all devices beforehand. However, in reality, it is difficult to implement an API beforehand for obtaining information of all devices due to the vast amount of information of all of the devices. Further, from the standpoint of development cost, implementing such an API is unrealistic in a case where it is unclear whether the implemented API is going to be used. Moreover, because devices are designed with general purpose device interfaces (e.g., USB (Universal Serial Bus)), it is almost impossible to know beforehand the API regarding control of the apparatus via the device interface.

SUMMARY OF THE INVENTION

The present invention may provide an image forming apparatus, a function adding method, and a computer-readable recording medium that substantially eliminate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image forming apparatus, a function adding method, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image forming apparatus including: an application platform including at least one interface having an implementation that is blank; and an applying part configured to apply at least one additional program, capable of being dynamically added to another program, to the interface.

Other objects, features and advantages of the present invention will become more apparent from the following detailed description when read in conjunction with the accompanying drawings.

DETAILED DESCRIPTION OF THE PREFERRED EMBODIMENTS

Figure 1:
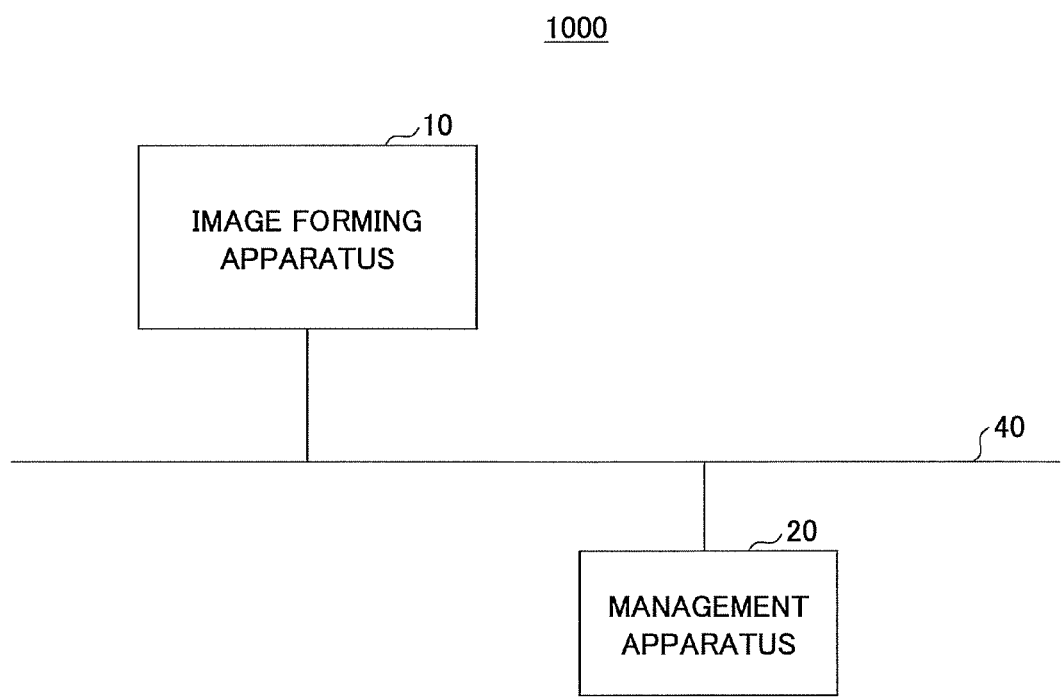
FIG. 1 is a schematic diagram illustrating an exemplary configuration of a machine management system according to an embodiment of the present invention.

FIG. 1 is a schematic diagram illustrating an exemplary configuration of a machine management system 1000 according to an embodiment of the present invention. The machine management system 1000 of FIG. 1 includes an image forming apparatus 10 and a management apparatus 20 that are connected by a network 40 such as a LAN (Local Area Network) of an office. The network 40 may be a wired network or a wireless network.

In this embodiment, the image forming apparatus 10 is an image forming apparatus (multifunction machine) having plural functions (e.g., copier function, facsimile function, printer function, scanner function) provided in a single housing. Alternatively, the image forming apparatus 10 may be an image forming apparatus providing one of the plural functions.

The management apparatus 20 is a computer that performs, for example, management of an additional program(s) to be applied to programs used in the image forming apparatus 10 and transfers the additional program to the image forming apparatus 10. In this embodiment, "additional program" refers to a program capable of dynamically interrupting a predetermined process (a program defined in the additional program) and added to a given location of a target program of the image forming apparatus 10.

Figure 2:
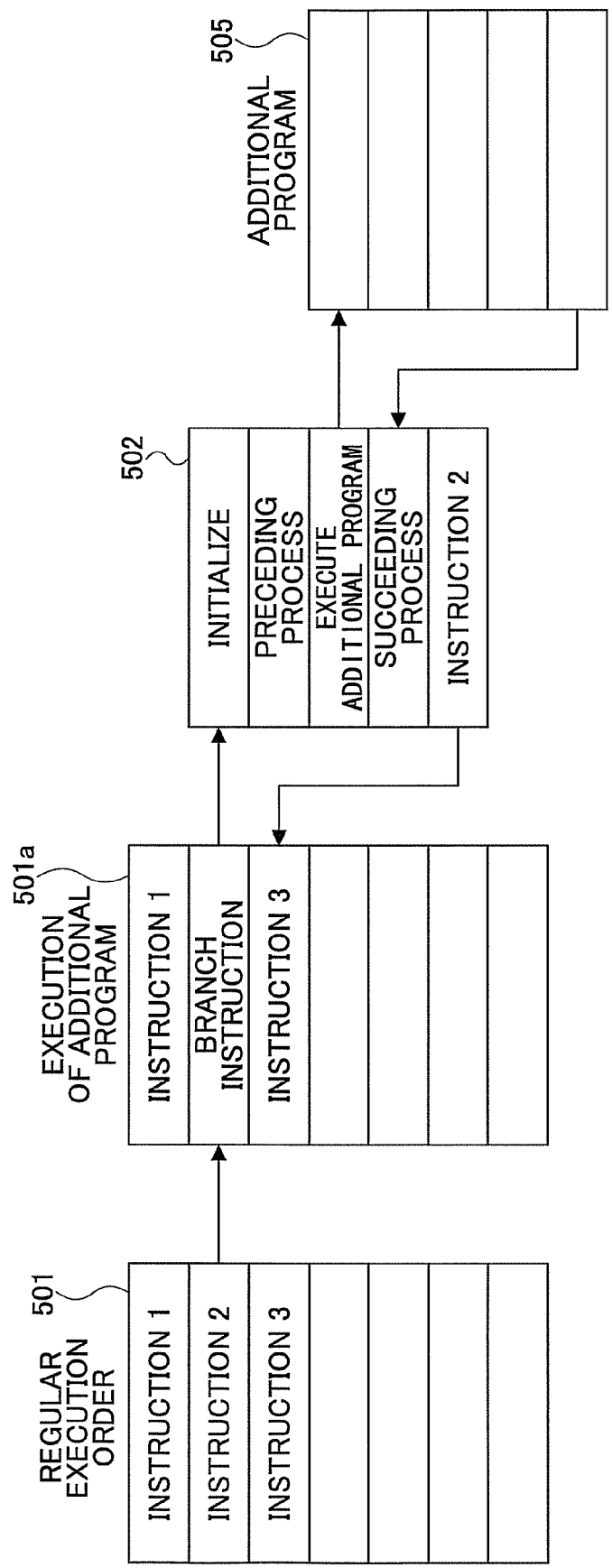
FIG. 2 is a schematic diagram for describing an additional program.

FIG. 2 is a schematic diagram for describing an additional program. FIG. 2 indicates an arrangement of instructions of a virtual memory of a program 501 to which an additional program 505 is to be applied (added). In a case before the additional program 505 is added (a case where the arrangement of instructions are executed in a regular order), the program 501 executes instruction 1, instruction 2, and instruction 3 in this order. Reference numeral 501a indicates the program 501 in a state of the additional program 505 being added. In the example illustrated in FIG. 2, a process of the additional program 505 is added between the instruction 1 and the instruction 2. In this case, the instruction 2 is replaced with a branch instruction and executed in accordance with a table 502. The table 502 is defined to execute the instruction 2 after an initializing process, a pre-process (e.g., a variable being added to a stack), a process of calling the additional program 505, and a post-process (e.g., extracting the added variable from the stack) and then returning to the instruction 3 of the program 501a.

In other words, in a case of applying (adding) an additional program, a process of the additional program is executed when the execution reaches a predetermined location of the target program to which the additional program is to be added. After the process of the additional program is executed, control of the processes is returned to the target program. Then, the target program resumes execution of remaining processes from the location where the additional program is added. The additional program not only contains information of a process to be added (interrupting process) but also information of the target program and information identifying the location at which the process of the additional program is to be added.

Data regarding, for example, variables of the target program can be referred to in the additional program. Therefore, interruption (addition) of, for example, a process for outputting log data (e.g., value of variables) of a given location of the target program, a process for correcting a bug, or a process for realizing a new function can be performed by using the additional program.

Accordingly, the additional program can dynamically perform output of log data, correction of bugs, or reinforcement of functions without having to perform correction, compiling, and linking of source codes and also without having to perform re-installation.

In this embodiment, the act of applying (adding) the additional program to the target program and making the additional program operational is referred to as "validating (validation)" of the additional program. That is, in this embodiment, to validate the additional program is to load the additional program into a memory and add (insert) a branch instruction (process) of the loaded additional program to the target program. In other words, the additional program does not function (not operational) by merely transferring the additional program to the image forming apparatus 10. That is, in order to add (interrupt) the branch instruction (process) to the target program, the additional program is validated. On the other hand, in a case of releasing (removing) the additional program from the target program, the additional program is "invalidated".

Figure 3:
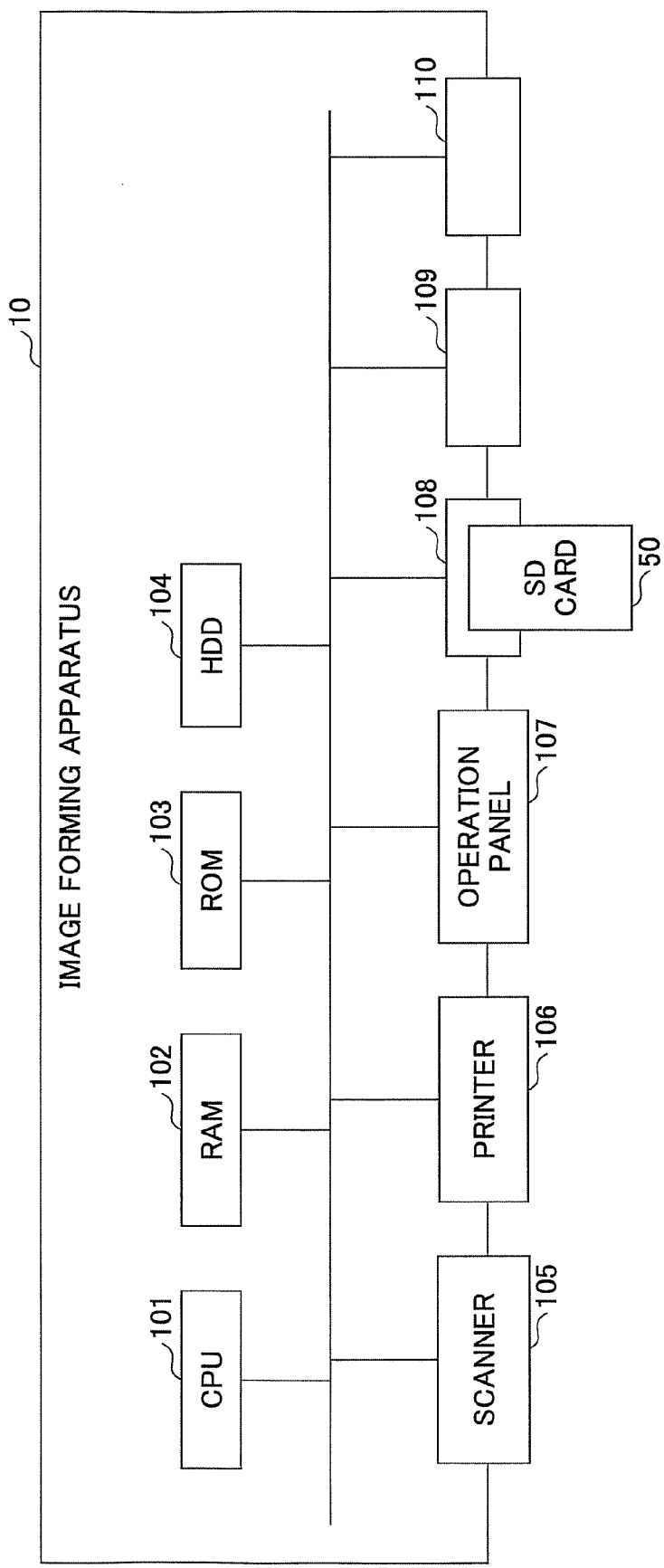
FIG. 3 is a schematic diagram illustrating a hardware configuration of an image forming apparatus according to an embodiment of the present invention.

FIG. 3 is a schematic diagram illustrating a hardware configuration of the image forming apparatus 10 according to an embodiment of the present invention. In FIG. 3, the image forming apparatus 10 includes hardware parts such as a CPU 101, a RAM 102, a ROM 103, a HDD 104, a scanner 105, a printer 106, an operation panel (control panel) 107, an SD card slot 108, a USB port 109, and a network interface 110.

Various programs and data used for the programs are stored (recorded) in the ROM 103. The RAM 102 is used as an area in which programs to be loaded are stored (recorded) or as a workspace for various processes to be performed on the loaded programs. The CPU 101 achieves various functions by executing the processes of the loaded programs. Programs and various data used by the programs may also be stored in the HDD 104. The scanner 105 is for reading out image data from documents and the like. The printer 106 is for printing image data to a sheet(s) of printing paper. The operation panel 107 includes an input part for receiving input from a user and a display part (e.g., liquid crystal panel) for displaying various data to the user. The SD card slot 108 is for reading out a program(s) recorded in an SD card 50. In the image forming apparatus 10, not only are the programs recorded and stored in the ROM 103 loaded into the RAM 102 and executed, but also the programs recorded in the SD card 50 may be loaded into the RAM 102 and executed. The USB port 109 is a connector serving as a USB (Universal Serial Bus) interface. The network interface 110 is a hardware interface for connecting to a network (e.g., a wireless network, a wired network).

Figure 4:
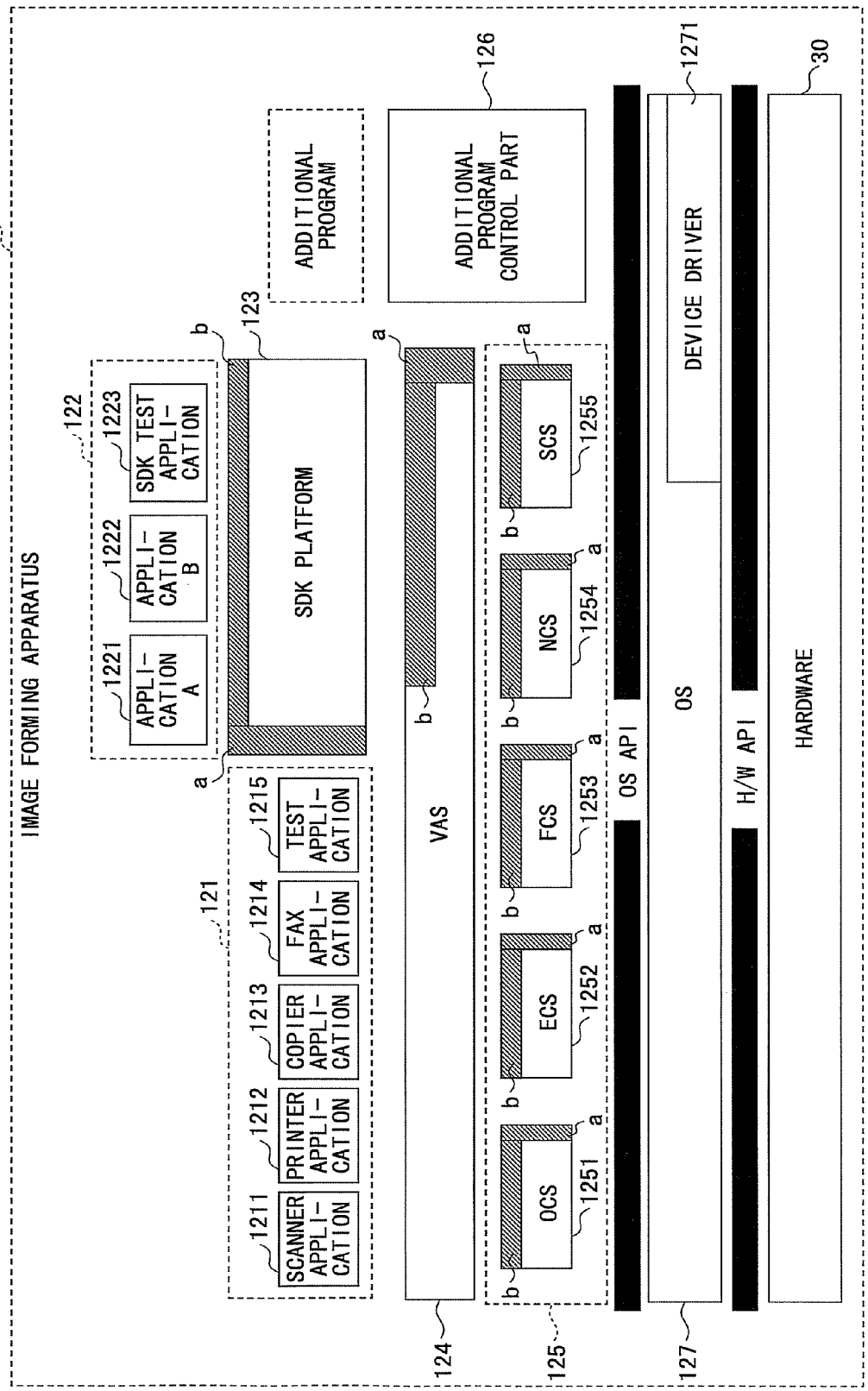
FIG. 4 is a schematic diagram illustrating a software configuration of an image forming apparatus according to an embodiment of the present invention.

FIG. 4 is a schematic diagram illustrating a software configuration of the image forming apparatus 10 according to an embodiment of the present invention. In FIG. 4, the image forming apparatus 10 includes, for example, a standard application 121, a SDK (Software Development Kit) application 122, an SDK platform 123, a virtual application service (VAS) 124, a control service 125, an additional program control part 126, and an OS (Operating System) 127.

The standard application 121 includes a group of application programs that are standardized to be implemented beforehand (e.g., implemented before shipment). In FIG. 4, the standard application 121 includes a scanner application 1211, a printer application 1212, a copier application 1213, a fax application 1214, and a test application 1215. The scanner application 1211 executes scanning jobs. The printer application 1212 executes printing jobs. The copier application 1213 executes copying jobs. The fax application 1214 executes facsimile transmitting jobs and facsimile receiving jobs. In a case where, for example, an application platform of the image forming apparatus 10 is reinforced (strengthened) with a new function, the test application 1215 executes a test(s) for determining the validity of the new function. The range of the application platform of the image forming apparatus 10 is described in detail below.

A control service 125 is a group of software modules that provide functions for controlling hardware resources and the like (API) for a super-ordinate application and the like (e.g., the standard application 121, the SDK platform 123). In FIG. 4, the control service 125 includes an operation panel control service (OCS) 1251, an engine control service (ECS) 1252, a facsimile control service (FCS) 1253, a network control service (NCS) 1254, and a system control service (SCS) 1255. The OCS 1251 provides an API for performing controls on the operation panel 107. The ECS 1252 provides an API for performing controls on an engine portion of an image forming part such as the scanner 105 and the printer 106. The FCS 1253 provides an API for performing controls on facsimile. The NCS 1254 provides an API for performing controls on network communications. The SCS 1255 provides an API for performing controls on system management inside the image forming apparatus 10 or an API for performing controls on various data of the image forming apparatus 10.

The VAS 124 intervenes between the control service 125 and its super-ordinate applications (e.g., the standard application 121, the SDK platform 123). More specifically, the VAS 124 provides wrapped API of the control service 125 to super-ordinate applications. By wrapping the control service 125 with the VAS 124, the API of the control service 125 can be hidden from super-ordinate applications. As a result, the VAS 124 can absorb changes of the API due to, for example, upgrades of the control service 125 and obtain compatibility for the super-ordinate applications with the upgrades.

The SDK application 122 is an application program additionally developed and implemented after shipment of the image forming apparatus 10 for serving as a plug-in that expands the functions of the image forming apparatus 10. In FIG. 4, the SDK application 122 includes an application A 1221, an application B 1222, and an SDK test application 1223. The applications A and B are SDK applications 122 for providing predetermined services. For example, the application A 1221 may be an SDK application 122 developed by vendor A, and the application A 1222 may be an SDK application 122 developed by vendor B. In a case where function reinforcement and the like are performed on the application platform of the image forming apparatus 10, the SDK test application 1223 executes a test for determining whether the reinforcement of the function is valid from the standpoint of any influences on the SDK platform 123.

The SDK platform 123 provides an environment for executing the SDK application 122. Each SDK application is developed using an API (class library) provided by the SDK platform 123. The SDK platform 123 provides the API in Java (Registered Trademark) language that is less machine-dependent and has higher development efficiency compared to the API provided by the control service 125. Therefore, the SDK application 122 is implemented with Java (Registered Trademark). In FIG. 4, the SDK platform 123 includes a Java (Registered Trademark) virtual machine. Accordingly, the SDK application 122 can use a class library of Java (Registered Trademark) standard.

It is to be noted that, in this embodiment, the SDK applications 122 and the SDK platform 123 are recorded in the SD card 50. The SDK application 122 and the SDK platform 123 may also be recorded in other portable computer-readable recording media (e.g., USB memory, CD-ROM). Further, the SDK application 122 and the SDK platform 123 may be distributed in a network and obtained from the network.

FIG. 4 illustrates a state where the SDK application 122 and the SDK platform 123 are loaded from the SD card 50 into a virtual memory.

The additional program control part 126 receives an additional program transferred from the management apparatus 20 and loads the additional program in the RAM 102. Further, the additional program control part 126 performs controls (e.g., validation or invalidation) on the additional program in accordance with instructions transmitted from the management apparatus 20.

The OS (Operating System) 127 includes, for example, a device driver 1271. Each of the software applications in the image forming apparatus 10 is operated as threads and processed by the OS 127. The device driver 1271 performs controls on a device connected to a general-purpose device interface (e.g., USB port 109) of the image forming apparatus 10.

Except for the SDK application 122 and the SDK platform 123 (excluding the Java (Registered Trademark) virtual machine), the programs of the image forming apparatus 10 illustrated in FIG. 4 are in native code, that is, programs converted into a machine language that can be executed by the CPU 101.

In FIG. 4, in a case of supposing that the SDK platform 123 is an application platform in a narrow sense, the SDK platform 123, the VAS 124, and the control service 125 could be considered to correspond to an application platform in a broad sense (a part for realizing an application platform). This is because, although the SDK platform 123 may only be visible to a developing vendor of the SDK application 122, the VAS 124 and the system control 125 are also necessary for the SDK platform 123 to function. In the following description according to an embodiment of the present invention, a term simply described as an "application platform" refers to a part constituted by the SDK platform 123, the VAS 124, and the control service 125. That is, in this embodiment, an application platform is formed of plural layers including, in a descending order, the SDK platform 123, the VAS 124, and the control service 125.

As illustrated in FIG. 4, each of the layers 123, 124, 125 that form the application platform includes a part indicated with a reference letter "a" and a part indicated with a reference letter "b". The part "a" is an implementing part for enabling a new API to be substantially added without having to perform, for example, coding and compiling. The part "b" is an implementing part for enabling the content of a process (implementing content) to be, changed without having to perform, for example, coding and compiling. However, no special implementing process is required to be performed for the part "b". This is because an already existing API can be dynamically changed by adding (applying) an additional program. Thus, the part "b" may be a part indicating a location at which the additional program is to be added.

Technically, a new API cannot be added without performing, for example, coding and compiling (in particular, native code). Therefore, according to an embodiment of the present invention, the addition of a new API is virtually achieved. More specifically, the part "a" is implemented as a blank function or method (hereinafter also referred to as "dummy function"). The term "blank" is not limited to a completely blank function or method (nothing written in the function) but may be a substantially blank function or method. The substantially blank function or method may be a function without any step written for achieving a particular function. For example, a recording step of a log (a step of recording the calling of a function) is not a step for achieving a particular function. Therefore, even if a function includes the recording step of the log, the function is considered to be a substantially blank function or method. Further, even if a function includes a dummy step of providing a location to which an additional program is to be added, this would not affect the requirement of a function or method having to be blank.

The number of a dummy function of each layer of the application platform may be a single number or plural numbers. Further, the name of the function may be arbitrarily set, for example, as func1 and func2. The type of argument or return value is preferred to be one that enables any type of data to be stored or referred to.

The implementing of the dummy function is performed by using an additional program. The location to which the additional program is to be added is set with a dummy function. By applying the additional program with the dummy function, a process implemented in the additional program can be executed when the dummy function is called for. As a result, a new API for achieving a function that was not included in the initial application platform can be substantially added to, for example, the SDK platform 123, the VAS 124, and the control service 125.

The location (part) at which the dummy function is implemented or the target to which the additional program is applied may be limited to a part converted (compiled) to a native code (code executable by the CPU 101). In other words, in a case of performing addition of a new API or changing of an existing API, the part implemented with Java (Registered Trademark) does not necessarily require implementing of the dummy function or applying of the additional function. This is because the part implemented with Java (Registered Trademark) has high expandability and is easy to add a new API to. Further, this is because the processes of an existing API can be easily changed owing to, for example, inheritance of the Java (Registered Trademark) language. The above-description, however, is not meant to exclude an embodiment where a dummy function is implemented in or an additional function is added to the part implemented with Java (Registered Trademark).

In the application platform according to an embodiment of the present invention, an API part of the SDK platform 123 is the part implemented with Java (Registered Trademark) whereas the VAS 124 and the control service 125 are parts converted to native code.

Figure 5:
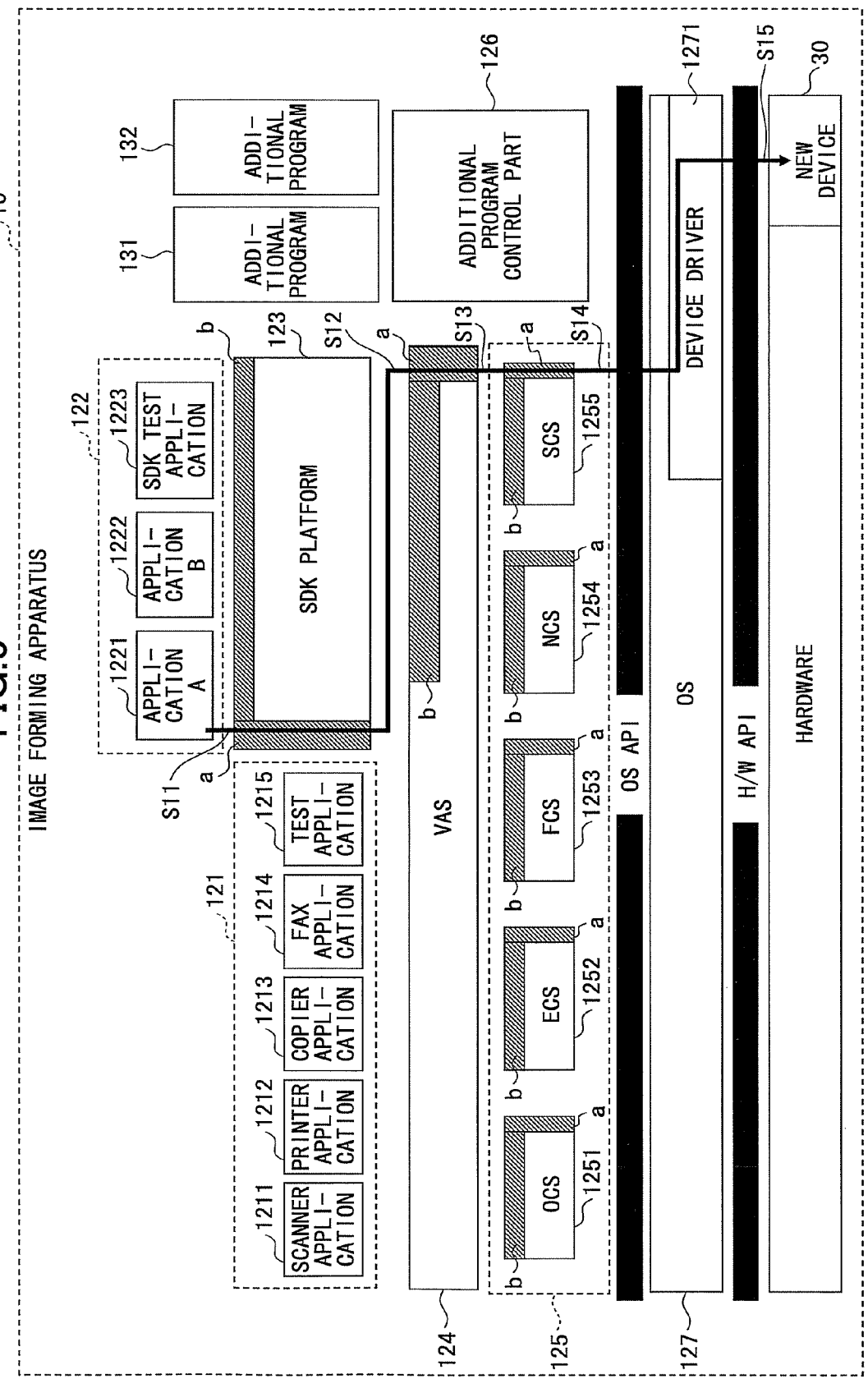
FIG. 5 is a schematic diagram for describing an example of adding a new API.

An example of adding a new API is described in detail below. FIG. 5 is a schematic diagram for describing the example of adding a new API. In the example illustrated in FIG. 5, a new device 30 (e.g., a device for achieving Z-fold) is connected to the image forming apparatus 10 via the USE port 109. At the level of the OS 127, the new device 30 can be controlled with a general purpose API (e.g., ioctl) via the device driver 1271. Meanwhile, in this case, however, the application platforms 123, 124, 125 are not yet prepared with an API for controlling the new device 30.

In the example illustrated in FIG. 5, an additional program 131 is implemented in the control service 125 and an additional program 132 is implemented in the VAS 124. More specifically, in this example, the location at which the additional program 131 is to be implemented is a dummy function (hereinafter referred to as "SOS dummy function") of part "a" of the SOS 1255. Further, the location at which the additional program 132 is to be implemented is a dummy function (hereinafter referred to as "VAS dummy function") of part "a" of the VAS 124. It is to be noted that the part "a" of the SOS 1255 is hereinafter indicated as "SCS1255a", the part "a" of the VAS 124 is indicated as "VAS124a", and the parts of other layers of the application platform are also indicated in the same manner (for example, the part "a" of the SDK platform 123 is hereinafter indicated as "SDK123a"). The management apparatus 20 stores the implemented additional programs 131, 132 therein and manages the stored additional programs 131, 132. A class file of a new class having a method for receiving control requests of the new device 30 is added to SDK123a.

For example, the additional program 131 applied to the SCS dummy function has an implementation configured to designate an argument value for controlling the new device 30 in accordance with the argument value of the SCS dummy function and call for a corresponding general purpose API (e.g., ioctl, read, or write) of the OS 127. For example, the argument of the SCS dummy function may indicate a value designating the control to be performed on the new device 30.

The additional program 132 applied to the VAS dummy function has an implementation configured to designate an argument value in accordance with the argument value of the VAS dummy function and call for a corresponding SCS dummy function. In other words, the additional program applied to a dummy function of a super-ordinate layer is implemented to call for a corresponding dummy function of a sub-ordinate layer. It is to be noted that the argument value designated for the VAS dummy function may also be used as the argument value designated for the SCS dummy function without being converted (i.e. the argument value may be used as is). As an alternative case, the argument value designated for the VAS dummy function may be converted and the converted value may be the argument value designated for the SCS dummy function. The alternative case may be effective in a case where a more abstract value or a more general purpose value is desired to be designated as the argument of the VAS dummy function.

The method of the class to be added to the SDK123a has an implementation configured to designate an argument value in accordance with the content of a designated argument value and call for a corresponding VAS dummy function. It is to be noted that the argument value designated for the method of the class may also be used as the argument value designated for the VAS dummy function without being converted (i.e. the argument value may be used as is). As an alternative case, the argument value designated for the method of the class may be converted and the converted value may be the argument value designated for the VAS dummy function.

In a case where the user instructs the management apparatus 20 to transfer the additional programs 131, 132 to the image forming apparatus 10, the management apparatus 20 transfers the additional programs 131, 132. When the additional program control part 126 of the image forming apparatus 10 receives the additional programs 131, 132, the additional program control part 126 validates the additional programs 131, 132. In other words, the additional program 131 is turned into a state of being applied to the SCS dummy function and the additional program 132 is turned into a state of being applied to the VAS dummy function.

When the additional program 131 is applied to the SCS dummy function and the additional program 132 is applied to the VAS dummy function, the SDK application 122 can control or use the new device 30. FIG. 5 illustrates a state where the application A 1221 is controlling the new device 30. That is, the application A 1221 calls for a method of the class added to the SDK platform 123a (Step S11). A value corresponding to the content of the control requested by the application A 1221 is designated as the argument of the method of the added class. The argument of the method of the added class includes a value designated in correspondence with the content of the control requested by the application A 1221. The method of the added class calls the VAS dummy function according to the content implemented by the method (Step S12). Thereby, the additional program 132 is executed in response to the call of the VAS dummy function. Thus, as a result, the SCS dummy function is, substantially, called by the VAS dummy function (Step S13). Then, the additional program 131 is executed in response to the call of the SCS dummy function. Thus, as a result, the API (e.g., ioctl, read, write) of the OS 127 is, substantially, called by the SCS dummy function (Step S14). The API which is called by the SCS dummy function depends on the argument value designated by the SCS dummy function. The OS 127 performs controls on the new device 30 in response to the called API via the device driver 1271 (Step S15).

Hence, with the above-described embodiment of the present invention, even in a case where the application platform of the image forming apparatus 10 is not prepared with an API for controlling the new device, the API corresponding to the new device 30 can be added to the application platform of the image forming apparatus 10 by using the dummy functions and the additional programs 131, 132.

Figure 6:
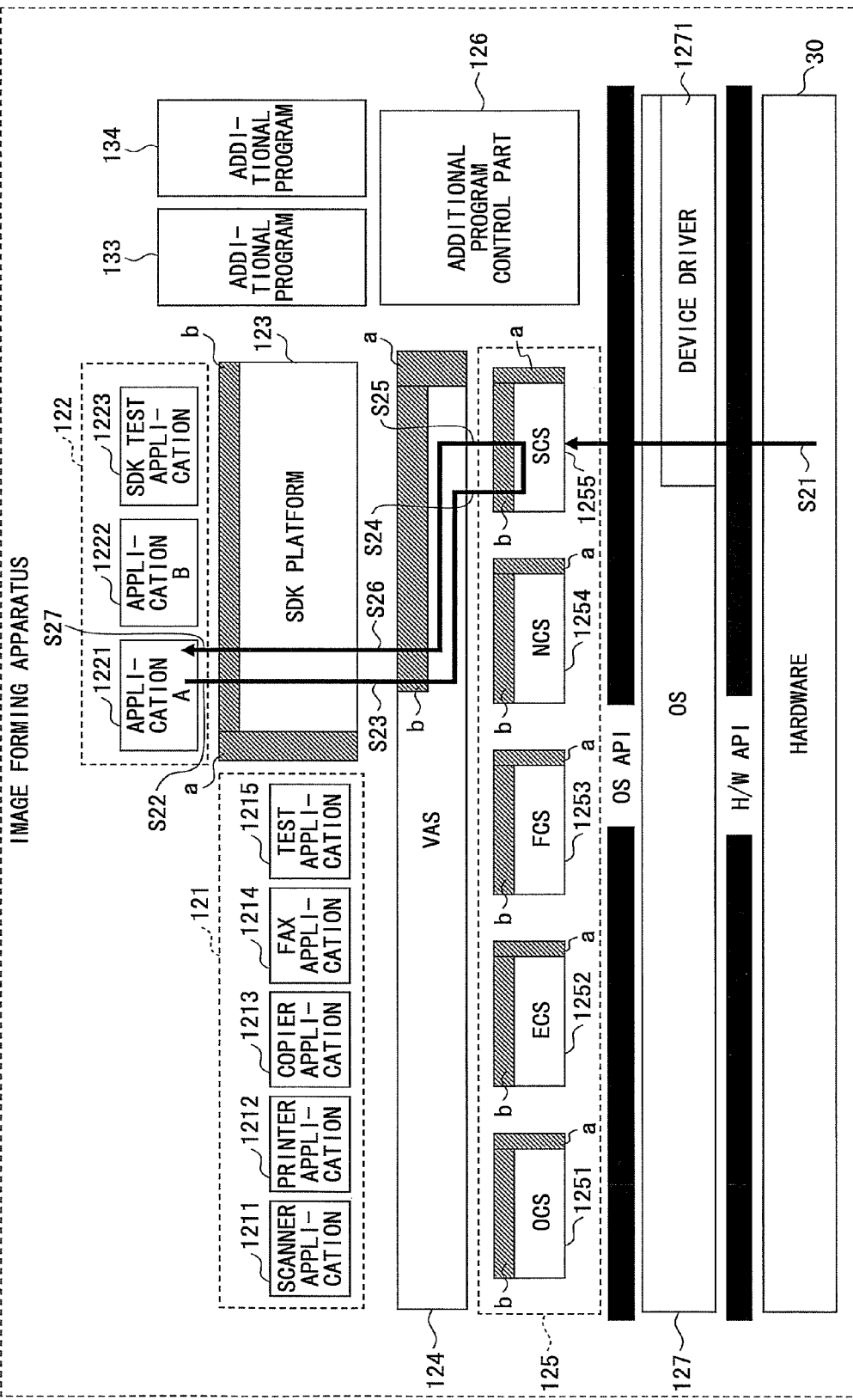
FIG. 6 is a schematic diagram for describing an example of changing an existing API.

Next, an example of changing an existing API is described in detail. FIG. 6 is a schematic diagram for describing the example of changing an existing API. As a pre-requisite of the image forming apparatus illustrated in FIG. 6, data regarding a predetermined hardware device (e.g., the scanner 105, the printer 106, or the operation panel 107) is reported to the SCS 1255 beforehand and a parameter of the predetermined hardware device (hereinafter referred to as "parameter A") is managed by the SCS 1255. However, the parameter A is used for a determining process by the SCS 1255 but has not been initially required by the SDK application 122. Therefore, the parameter A is not initially included in the SCS 1255 as a target to be provided (target of a return value) in the API of the SCS 1255 for providing data of the predetermined hardware (hereinafter also referred to as "data obtaining function S"). Under the above circumstance, FIG. 6 illustrates an example of enabling the SDK application 122 to refer to the parameter A.

In the example of FIG. 6, an additional program 133 is to be implemented as a part of the SCS 1255 containing the data obtaining function S. Further, an additional program 134 is implemented as a part of the VAS 124 containing an existing function of the VAS 124 (hereinafter also referred to as "data obtaining function V") configured to obtain data by calling the data obtaining function S and to provide the obtained data to, for example, the SDK platform 123. The management apparatus 20 stores the implemented additional programs 133, 134 therein and manages the stored additional programs 133, 134.

The additional program 133 to be applied to the data obtaining function S includes an implementation for adding the parameter A to, for example, an existing return value of the data obtaining function S. For example, the parameter A may be added by increasing the byte value of the return value and storing the parameter A in the space obtained by increasing the byte value. The additional program 134 to be applied to the data obtaining function V includes an implementation for adding the parameter A contained in the return value from the data obtaining function S to the return value of the data obtaining function V.

A subclass of an existing class is implemented in the SDK platform 123, which subclass has a method for providing data obtained by calling the data obtaining function V by the SDK application 122 (hereinafter referred to as "data obtaining method"). The data obtaining method of the sub-class is overridden. The content of the override is to add the parameter A contained in the return value from the data obtaining function V to the return value of the data obtaining method.

In a case where the user instructs the management apparatus 20 to transfer the additional programs 133, 134 to the image forming apparatus 10, the management apparatus 20 transfers the additional programs 133, 134 to the image forming apparatus 10. When the additional program control part 126 of the image forming apparatus 10 receives the additional programs 133, 134, the additional program control part 126 validates the additional programs 131, 132. In other words, the additional program 133 is turned into a state of being applied to a predetermined location of the data obtaining function S and the additional program 134 is turned into a state of being applied to a predetermined location of the data obtaining function V.

When the additional program 133 is applied to the predetermined location of the data obtaining function S and the additional program 134 is applied to the predetermined location of the data obtaining function. V, the SDK application 122 can obtain the parameter A. FIG. 6 illustrates a case where the SDK application 122 obtains data of a predetermined device 30 containing the parameter A.

Data of the predetermined device 30 containing the parameter A is reported to the SCS 1255 beforehand and managed by the SCS 1255 (Step S21). Then, the application A 1221 calls for the data obtaining method of the SDK platform 123 (Step S22). Then, the data obtaining function V is called for by the overridden part of the data obtaining method of the SDK platform 123 (Step S23). Then, the same as usual, the data obtaining function V calls for the data obtaining function S (Step S24). In the process of processing the data obtaining function S, the additional program 133 is executed when reaching the location to which the additional program 133 is to be applied. The additional program 133 executes a process of including the parameter A managed by the SCS 1255 into the return value of the SCS 1255. For example, the additional program 133 causes the SCS 1255 to obtain a value of the parameter A recorded in the memory 102 and the value obtained from the memory 102 to be added to the return value of the data obtaining function S. When control of the process is returned to the data obtaining function S, the return value with the parameter A added is returned to the data obtaining function V (Step S25). Then, the additional process 134 is executed when reaching the location to which the additional program 134 is to be applied. The additional program 134 executes a process of adding the parameter A contained in the return value of the data obtaining function S to the return value of the data obtaining function V. When control of the process is returned to the data obtaining function V, the return value with the parameter A added is returned to the data obtaining method (Step S26). Then, the data obtaining method returns a return value containing the parameter A added by the overridden part of the SDK platform 123 to the application A 1221 (Step S27). Thereby, the application A 1221 can perform a process using the parameter A.

It is to be noted that the obtaining of the parameter A may be achieved by adding a new API. How to obtain the parameter A by adding a new API can be understood by referring to the above-described example illustrated in FIG. 5 and further explanation thereof is omitted.

Next, an example of testing the validity of the adding of a new API or the changing of an existing API, for example, for applying of an additional program (i.e. validity of function reinforcement) is described in detail. The test of validity is performed by the test application 1215 or the SDK test application 1223.

Figure 7:
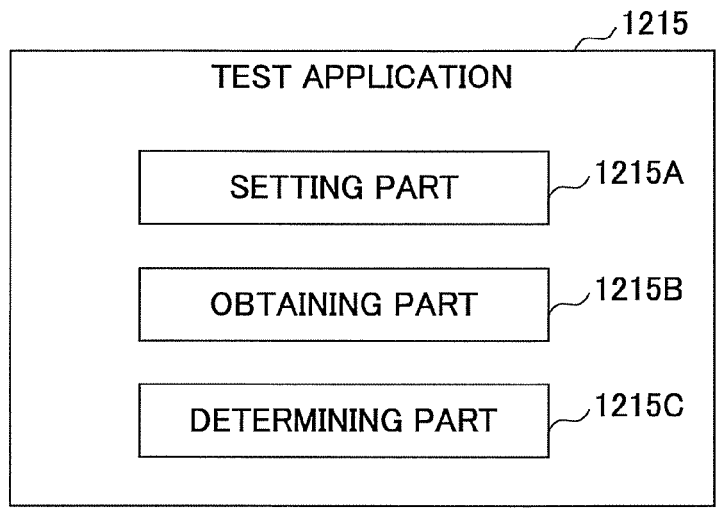
FIG. 7 is a schematic diagram illustrating a function configuration of a test application according to an embodiment of the present invention.

FIG. 7 is a schematic diagram illustrating a function configuration of the test application 1215 according to an embodiment of the present invention. In FIG. 7, the test application 1215 includes, for example, a setting part 1215A, an obtaining part 12153, and a determining part 1215C.

The setting part 1215A receives various settings (e.g., test conditions, determination conditions), sets the test conditions, determination conditions and the like, and records the set test condition, determination conditions and the like in the HDD 104. In this embodiment, the test conditions include data indicating a resource from which resource usage status (e.g., data indicating the consumption amount of a resource, hereinafter referred to as "resource data") is to be obtained and data indicating the timing for obtaining the resource data. In other words, the test conditions indicate a method for obtaining resource data. The test conditions may be, for example, data indicating a method of obtaining the usage rate of a CPU per second at one second intervals or obtaining the usage rate of a virtual memory (or usage rate of a physical memory) at one second intervals. The usage rate of the virtual memory (or usage rate of the physical memory) may be used as data for understanding the frequency at which swapping occurs. As the frequency of swapping becomes higher, the performance of the image forming apparatus 10 tends to degrade significantly. Therefore, understanding the frequency of swapping may be a significant element for testing validity.

The period for obtaining resource data (start time, end time, or time elapsed from the start of obtaining resource data) may be included in the test conditions. It is to be noted that the resource from which the resource data are obtained is not limited to a single resource. For example, the resource is not limited to the RAM 102, the CPU 101, the HDD 104, or a hardware device (e.g., electric power supply). For example, the resource may also be software components of the image forming apparatus 10 (e.g., a file descriptor or a virtual memory of the image forming apparatus 10).

The determination conditions may be data indicating a criterion for determining the validity of function reinforcement. The determination conditions are set as conditions corresponding to the resource data obtained according to the test conditions. The determination conditions may be, for example, a condition indicating that the average usage rate of the CPU is to be no more than +15% compared to the average usage rate of the CPU before the applying of an additional program or a condition indicating that the usage rate of the virtual memory is to be no more than +10% compared to the usage rate of the virtual memory before the applying of an additional program. It is to be noted that the determination conditions are not necessarily limited to a comparison a resource before the applying of an additional program. For example, the determination condition may be a comparison with an absolute value (e.g., a condition indicating that the average usage rate of the CPU is to be no more than XX).

The obtaining part 1215B obtains resource data according to the test conditions. The determining part 1215C determines validity based on the resource data obtained from the obtaining part 1215B and the determination conditions.

It is to be noted that the SDK test application 1223 may have substantially the same function configuration as the test application 1215. However, because the SDK test application 1223 operates on a Java (Registered Trademark) virtual machine, validity is determined based on resource data of a virtual resource of a Java (Registered Trademark) virtual machine process.

Figure 8:
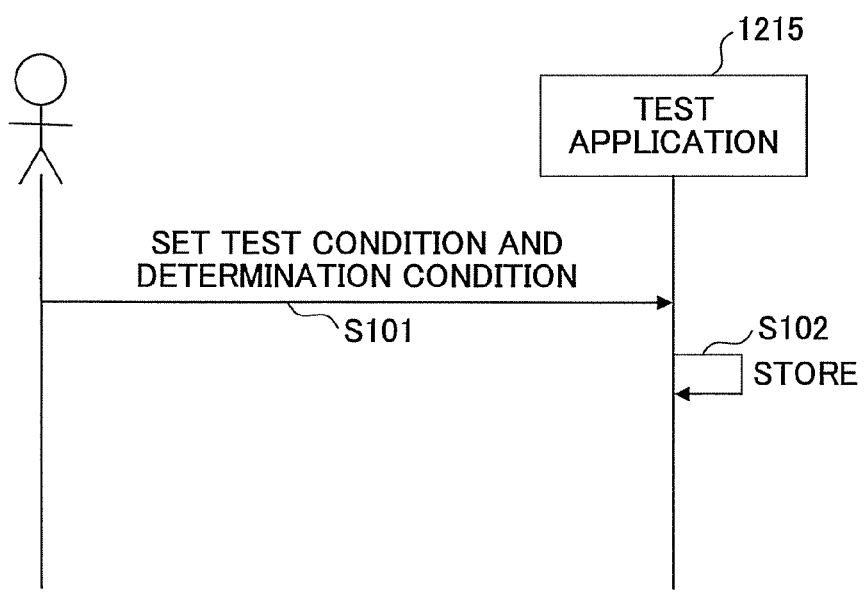
FIG. 8 is a sequence diagram for describing an operation for setting a test condition and a determination condition according to an embodiment of the present invention.

Next, an operation of testing validity is described. FIG. 8 is a sequence diagram for describing an operation (procedures) for setting a test condition(s) and a determination condition(s) according to an embodiment of the present invention. The operation illustrated in FIG. 8 is performed before an additional program is transferred from the management apparatus 20 to the image forming apparatus 10.

In the example illustrated in FIG. 8, an administrator or the like sets a test condition(s) and a determination condition(s) (Step S101). The setting is performed via a setting screen displayed on the operation panel 107 or a PC (Personal Computer) connected to the setting part 1215A of the test application 1215 of the image forming apparatus 10 via the network 40. Next, the setting part 1215A records (stores) the set test condition and the determination condition in the HDD 104 (Step S102).

It is to be noted that the operation of FIG. 8 is performed on both the test application 1215 and the SDK test application 1223.

Figure 9:
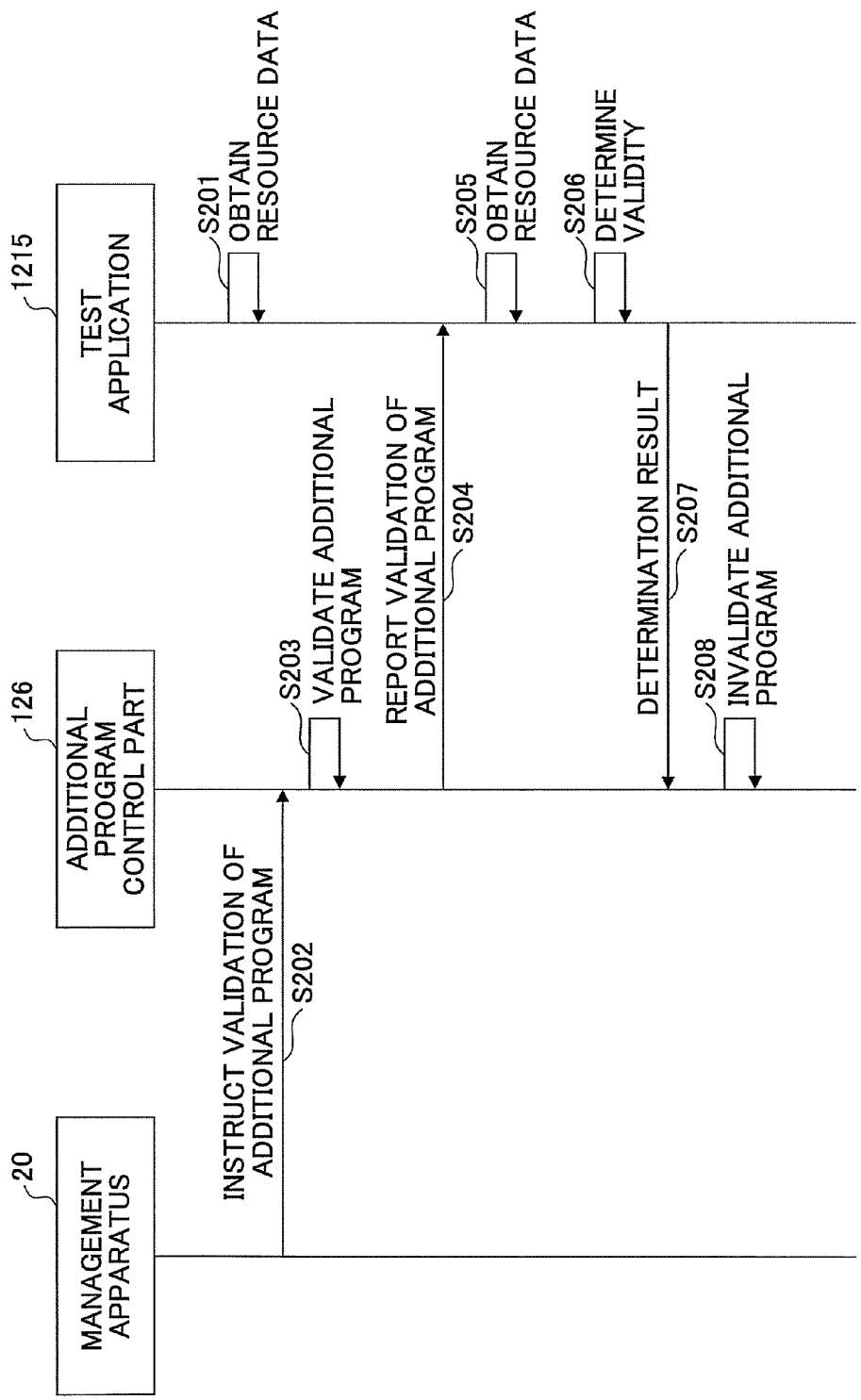
FIG. 9 is a sequence diagram for describing an operation of a test application according to an embodiment of the present invention.

FIG. 9 is a sequence diagram for describing an operation of the test application 1215 according to an embodiment of the present invention.

The obtaining part 1215B of the test application 1215 starts obtaining resource data according to, for example, test conditions and the like set by the setting part 1215A and records the obtained resource data in the HDD 104 (Step S201). The obtaining of the resource data may be performed periodically according to the test conditions.

Then, the additional program control part 126 receives an additional program and an instruction to validate the additional program from the management apparatus 20 (Step S202). Then, the additional program control part 126 validates the received additional program (Step S203). That is, the additional program is applied to a predetermined location to which the additional program is to be applied. Then, the additional program control part 126 reports the validation of the additional program to the test application 1215 (Step S204). An identifier of the additional program (program ID) may be designated in the report sent to the test application 1215.

The test application 1215 continues to obtain resource data according to test conditions even after the validation of the additional program is reported (Step 205). It is, however, to be noted that the test application 1215 records resource data obtained before the report of the validation of the additional program (resource data obtained in Step S201) and resource data obtained after the report of the validation of the additional program in a manner that the resource data obtained before and after the report of the validation of the additional program can be distinguished from each other. For example the former and the latter resource data may be recorded in different files or a column for indicating the validation of the additional program may be added to the history of the resource data recorded in chronological order.

Then, the determining part 1215C of the test application 1215 determines validity based on the obtained resource data and a predetermined determination condition(s) (Step S206). In a case where the determination condition is a condition indicating a comparison between resource data before the validation of the additional program and resource data after the validation of the additional program, the determining part 1215C determines validity based on the value of the difference between the resource data obtained in Step S201 and the resource data obtained in Step S205 and based on the determination condition. In this case, the difference between the resource data before the validation of the additional program and the resource data after the validation of the additional program is considered as the effect (influence) of applying the additional program.

Alternatively, in a case where the determination condition is a condition indicating a comparison with an absolute value, the determining part 1215C determines validity based on the comparison between the resource data obtained in Step S205 and the absolute data.

In Step S206, in a case where a time limit for obtaining resource data based on test conditions can be specified, the determination of validity may be automatically executed when the specific time limit is reached. The case of specifying the time limit for obtaining resource data may be performed by designating a limit to the test conditions. For example, the number of times of obtaining resource data (e.g., 10 times) may be designated or the period (e.g., 30 minutes) for obtaining the resource data may be designated. On the other hand, in a case where a time limit for obtaining resource data based on test conditions cannot be specified, the validity determination may be automatically performed by the determining part 12150 after a predetermined time elapses after the additional program is validated or performed according to instructions input from the user via, for example, the operation panel 107.

Then, the determining part 1215C reports the determination result (data indicating whether the addition is valid or invalid) to the additional program control part 126 (Step S207). The additional program control part 126 executes a process in accordance with the determination result. For example, in a case where the determination result indicates that the function reinforcement is invalid, the additional program control part 126 invalidates the additional program (Step S208). On the other hand, in a case where the determination result indicates that the function reinforcement is valid, the additional program control part 126 validates the additional program.

Next, the resource data obtaining process (Step S205) and the validity determining process (Step S206) are described in detail.

Figure 10:
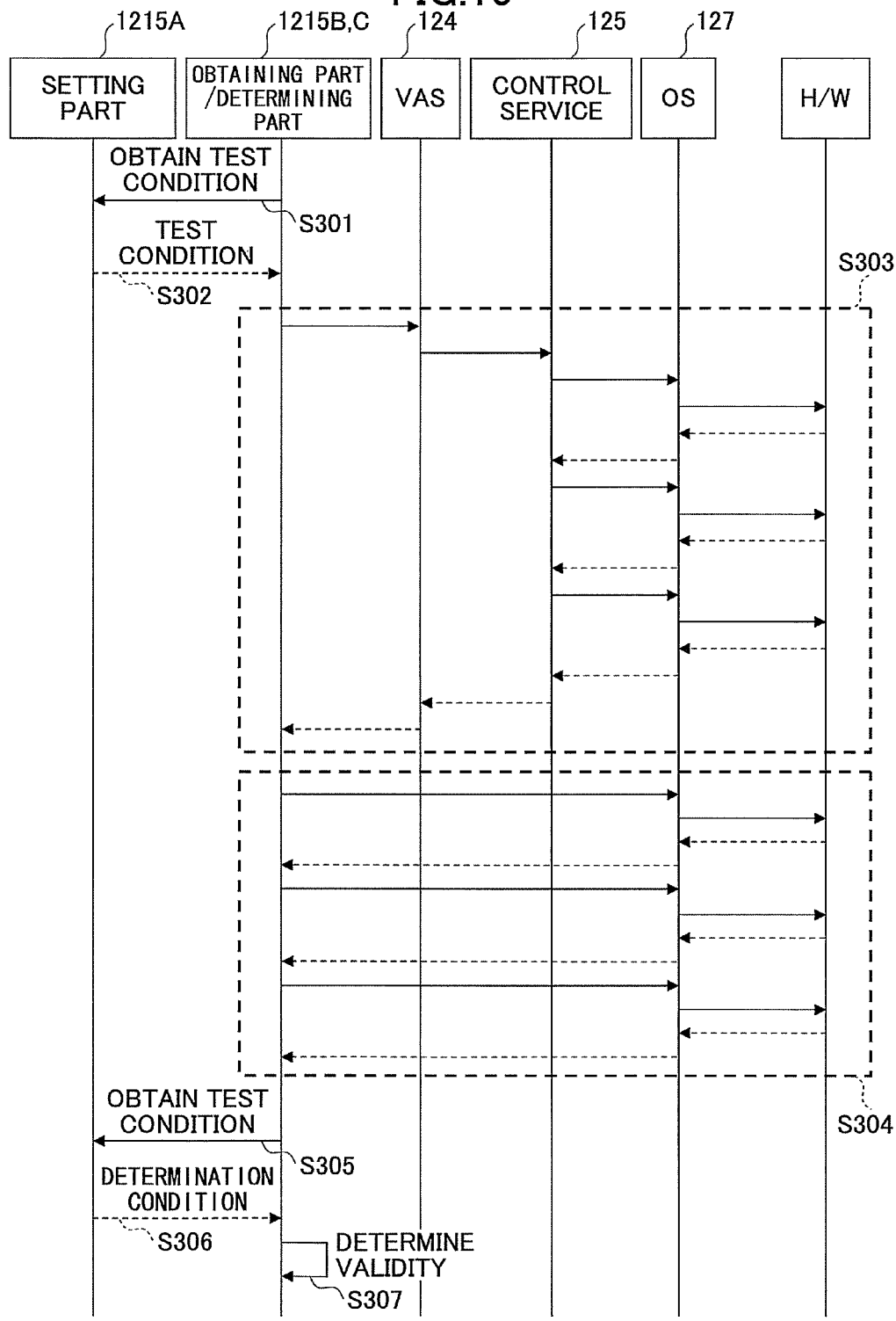
FIG. 10 is a sequence diagram for describing a first example of an operation including the resource data obtaining process and the validity determining process according to an embodiment of the present invention.

FIG. 10 is a sequence diagram for describing a first example of an operation including the resource data obtaining process and the validity determining process according to an embodiment of the present invention. The operation of FIG. 10 is started in response to the report of the validation of the additional program of Step S204 of FIG. 9.

The obtaining part 1215B of the test application 1215 requests the setting part 1215A to obtain a test condition(s) (Step S301). Then, the setting part 1215A obtains the test condition stored in the HDD 104 and outputs the test condition to the obtaining part 1215B (Step S302). Then, the obtaining part 1215B obtains resource data in accordance with the test condition. In the example illustrated in FIG. 10, resource data is periodically obtained (i.e. resource data is obtained by polling). In a case where resource data is obtained by polling, it is preferable for the test condition to include data indicating, for example, a polling period, a polling interval, and identification data of the resource subject to the polling.

The upper rectangular area illustrated with a dash line in FIG. 10 indicates a step of obtaining resource data via an API of the control service 125 dedicated for polling of resource data (Step S303). In this case, the obtaining part 1215B requests the control service 125 to perform polling for obtaining resource data via the VAS 124. In accordance with the request from the obtaining part 1215B, the control service 125 performs polling for obtaining resource data and outputs the results of the polling to the obtaining part 1215B.

The lower rectangular area illustrated with a dash line in FIG. 10 indicates a step where the obtaining part 1215B directly performs polling for obtaining resource data with respect to the OS 127. The resource data obtained via the OS 127 are returned to the obtaining part 1215B whenever the polling is performed.

The content of the Steps S303 and S304 may differ depending on the resource data of the resource designated to be obtained by the test condition (target resource data). For example, in a case where resource data obtainable by the control service 125 is not the target resource data, the Step S303 is not performed.

It is to be noted that the processes performed in Steps S301-S304 of FIG. 10 are also performed in Step S201 of FIG. 9.

After the obtaining of resource data, (e.g., after a resource obtaining period designated in the test condition has elapsed), the determining part 1215C requests the setting part 1215A to obtain a determination condition(s) (Step S305). The setting part 1215A obtains the determination condition stored in the HDD 104 and outputs the determination condition to the determining part 1215C (Step S306). Then, the determining part 1215C determines validity based on the determination condition and the resource data obtained by the obtaining part 1215B (Step S307).

Although in the first example illustrated in FIG. 10 where resource data is obtained (measured) by polling, it may perhaps be difficult to detect the maximum amount of resources consumed instantaneously, and the first example is suitable in a case where there is significance in detecting the average value of consumption of resources for a predetermined unit of time. For example, in terms of the CPU usage rate or the virtual memory usage rate, it is important to detect the average consumption (usage) of the CPU or the virtual memory. Therefore, the first example of obtaining (measuring) resource data by polling is suitable.

In the case of obtaining resource data by polling, it is preferable to, for example, extend the interval of polling to the extent of not affecting the workload of jobs executed by the image forming apparatus or to adjust (correct) the resource data considering the workload caused by the polling.

Figure 11:
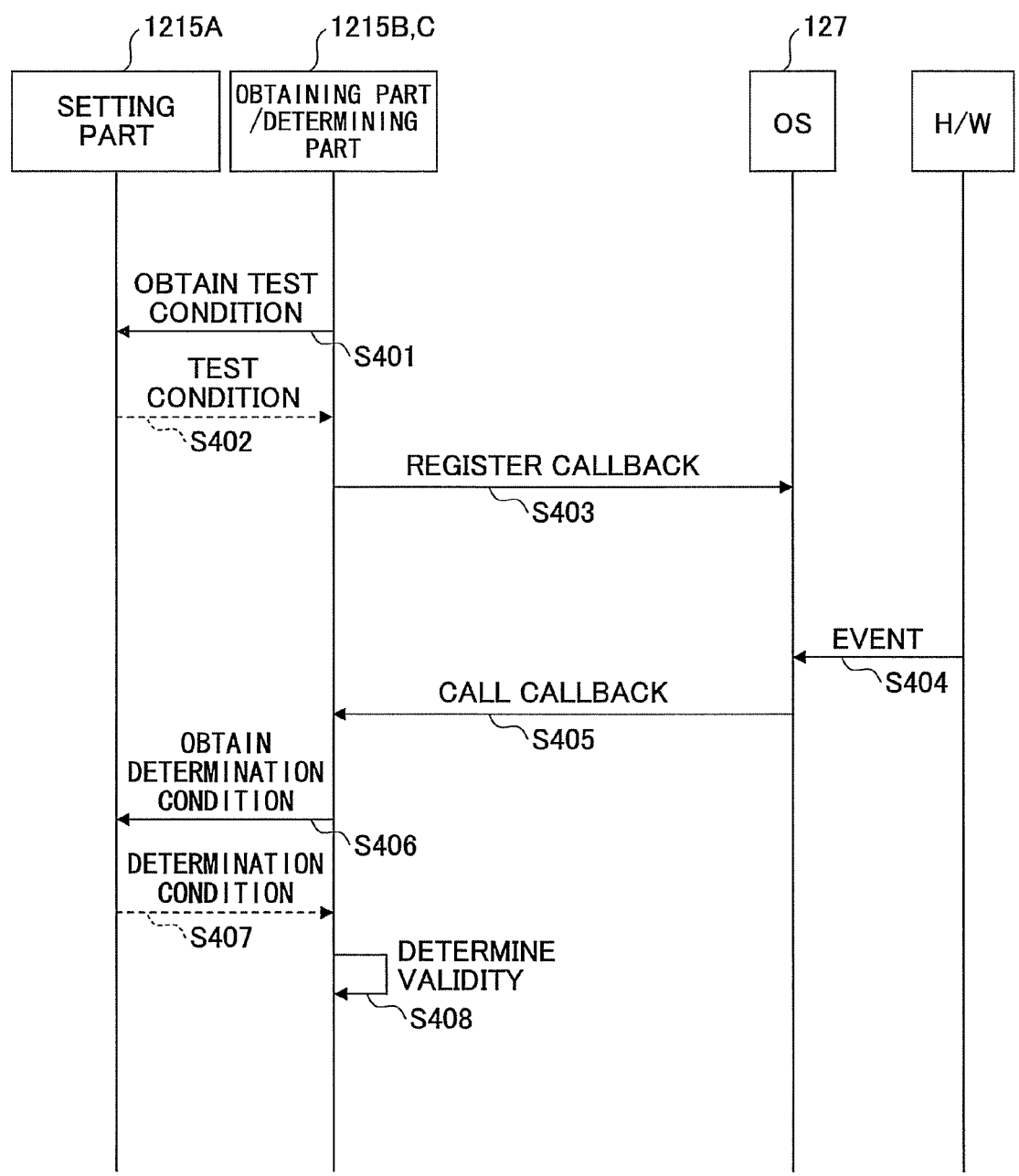
FIG. 11 is a sequence diagram for describing a second example of an operation including the resource data obtaining process and the validity determining process according to an embodiment of the present invention.

Next, FIG. 11 is a sequence diagram for describing a second example of an operation including the resource data obtaining process and the validity determining process according to an embodiment of the present invention. The operation of FIG. 11 may be performed as an alternative of the operation illustrated in FIG. 10.

Steps S401 and S402 are substantially the same as Steps S301 and S302 of FIG. 10. After Steps S401 and S402, the obtaining part 1215B of the detecting application 1215 registers (records) a callback function with respect to the OS 127 and a condition for calling the callback function (hereinafter also referred to as "calling condition") (Step S403) with the OS 127. The callback function is based on a predetermined test condition. For example, the test condition of the second example of FIG. 11 is whether resource data of a certain resource(s) has become a predetermined state (e.g., the usage rate of the CPU has exceeded N %). Accordingly, in this case, the calling condition is "the usage rate of the CPU has exceeded N %". Plural callback functions each having different calling conditions may be registered with the OS 127.

Then, in a case where the OS 127 detects that at least one of the recorded calling conditions is satisfied according to an event(s) reported in correspondence with changes of resource status obtained from a hardware device(s), the OS 127 calls a callback function (Step S405).

The determining part 1215C of the detecting application 1215, in response to the call of the callback function, requests the setting part 1215A to obtain a determination condition(s) (Step S406). The setting part 1215A obtains the determination condition stored in the HDD 104 and outputs the obtained determination condition to the determination part 1215C (Step S407). Then, the determination part 1215C determines validity based on the determination condition and the calling condition associated to the called callback function (test condition) (Step S408). For example, in a case where the determination condition is "the usage rate of the CPU is equal to or less than 70%", and the calling condition is "the usage rate of the CPU has become equal to or more than 70%", the determination condition responsive to the calling of the callback is not satisfied. Therefore, the determining part 1215C determines the function reinforcement to be invalid.

The second example illustrated in FIG. 11 where resource data is obtained (measured) by an event-driven type method is suitable in a case where there is significance in detecting the maximum amount of resources consumed instantaneously. For example, in terms of resource data such as a file descriptor having a limited size, it is important to detect the maximum amount of consumption even when such consumption occurs instantaneously. Therefore, the second example of obtaining (measuring) resource data by the event-driven type method is suitable.

Although the test application 1215 is described using FIGS. 9-11, the SDK test application 1223 may also be described in the same manner.

In the above-described embodiments of the present invention, in a case where the SDK application 122 calls an added or changed API (e.g., application A 1221 of FIG. 5 or FIG. 6), the calling of the API is performed asynchronously with respect to the obtaining of resource data. Alternatively, the SDK application 122, which is to call the API, may execute the obtaining of resource data at the timing of calling the API and determine validity based on the obtained resource data. Alternatively, at the timing of calling the API, the SDK application 122 may report calling of the API to the test application 1215 or the SDK test application 1223. Thereby, the test application 1215 or the SDK test application 1223 may obtain resource data in response to the report from the SDK application 122.

Accordingly, resource data can be timely obtained when the API is called. As a result, validity can be determined based on the timely obtained resource data.

Hence, with the image forming apparatus 10 according to the above-described embodiments of the present invention, adding of a new API or changing of an existing API can be easily performed. Further, the influence (validity) of adding the new API or changing the existing API can be appropriately tested. Therefore, significant degrading of the performance of the image forming apparatus 10 due to the addition or change of API can be prevented.

The present invention is not limited to the specifically disclosed embodiments, and variations and modifications may be made without departing from the scope of the present invention.

The present application is based on Japanese Priority Application No. 2009-283310 filed on Dec. 14, 2009, the entire contents of which are hereby incorporated herein by reference.

What is claimed is:

1. An image forming apparatus, comprising:
a memory having stored therein:
   a first program configured to request a newly connected device to the image forming apparatus to operate,
   an application platform including at least one blank interface and plural layers, and
   at least one additional second program; and
a processor coupled to the memory and including an applying part configured to apply the at least one additional second program, capable of being dynamically added to the first program, to the at least one blank interface,
wherein the at least one blank interface having an implementation that is blank is provided to each of the plural layers,
wherein the applying part is configured to apply plural of the at least one additional second programs to the at least one blank interface provided to a corresponding layer of the plural layers,
wherein one of the plural at least one additional second programs of a super-ordinate layer of the plural layers is configured to call the at least one blank interface of a subordinate layer of the plural layers, and
wherein a location to which the at least one additional second program is to be added to the first program is set with the at least one blank interface and a process included in the at least one additional second program is called via the at least one blank interface in response to a request from the first program.

2. The image forming apparatus as claimed in claim 1, further comprising:
an obtaining part configured to obtain resource data of the image forming apparatus in response to the applying of the at least one additional second program by the applying part; and
a determining part configured to determine validity of the applying of the at least one additional second program by comparing the obtained resource data with a predetermined determination condition.

3. The image forming apparatus as claimed in claim 2, wherein the obtaining part is configured to obtain the resource data before the applying of the at least one additional second program, and wherein the determining part is configured to determine the validity based on the resource data obtained before the applying of the at least one additional second program and the predetermined determination condition.

4. A function adding method for operating an image forming apparatus including an application platform, the application platform including at least one blank interface and plural layers, the function adding method comprising the steps of:
requesting a newly connected device to the image forming apparatus to operate by a first program;
applying at least one additional second program, capable of being dynamically added to the first program, to the at least one blank interface,
wherein the at least one blank interface having the implementation that is blank is provided to each of the plural layers,
wherein the applying step includes a step of applying plural of the at least one additional second program to the at least one blank interface provided to a corresponding layer of the plural layers,
wherein one of the plural at least one additional second program of a super-ordinate layer of the plural layers is configured to call the at least one blank interface of a subordinate layer of the plural layers, and
wherein a location to which the at least one additional second program is to be added to the first program is set with the at least one blank interface and a process included in the at least one additional second program is called via the at least one blank interface in response to a request from the first program.

5. The function adding method as claimed in claim 4, further comprising the steps of:
obtaining resource data of the image forming apparatus in response to the applying of the at least one additional second program; and
determining validity of the applying of the at least one additional second program by comparing the obtained resource data with a predetermined determination condition.

6. The function adding method as claimed in claim 5, wherein the obtaining step includes a step of obtaining the resource data before the applying of the at least one additional second program, and wherein the determining step includes a step of determining the validity based on the resource data obtained before the applying of the at least one additional second program and the predetermined determination condition.

7. A non-transitory computer-readable recording medium on which a program for causing a computer of an image forming apparatus to execute a function adding method is recorded, the image forming apparatus including an application platform including at least one blank interface and plural layers, the function adding method comprising the steps of:
- requesting a newly connected device to the image forming apparatus to operate by a first program; and
- applying at least one additional second program, capable of being dynamically added to the first program, to the at least one blank interface,
- wherein the at least one blank interface having the implementation that is blank is provided to each of the plural layers,
- wherein the applying step includes a step of applying plural of the at least one additional second programs to the at least one blank interface provided to a corresponding layer of the plural layers,
- wherein one of the plural at least one additional second programs of a super-ordinate layer of the plural layers is configured to call the at least one blank interface of a subordinate layer of the plural layers, and
- wherein a location to which the at least one additional second program is to be added to the first program is set with the at least one blank interface and a process included in the at least one additional second program is called via the at least one blank interface in response to a request from the first program.

8. The non-transitory computer-readable recording medium as claimed in claim 7, wherein the function adding method further comprises the steps of:
- obtaining resource data of the image forming apparatus in response to the applying of the at least one additional second program; and
- determining validity of the applying of the at least one additional second program by comparing the obtained resource data with a predetermined determination condition.

9. The non-transitory computer-readable recording medium as claimed in claim 8, wherein the obtaining step includes a step of obtaining the resource data before the applying of the at least one additional second program, and wherein the determining step includes a step of determining the validity based on the resource data obtained before the applying of the at least one additional second program and the predetermined determination condition.

* * * * *